Oct. 5, 1943.　　　　A. DIEBOLD　　　　2,330,872

TRAFFIC ANALYZER

Filed Dec. 7, 1940　　　　8 Sheets-Sheet 1

INVENTOR
ANTON DIEBOLD.
BY
ATTORNEY

Oct. 5, 1943.  A. DIEBOLD  2,330,872
TRAFFIC ANALYZER
Filed Dec. 7, 1940  8 Sheets-Sheet 2

INVENTOR
ANTON DIEBOLD
BY Victor D. Borst
ATTORNEY

Oct. 5, 1943.  A. DIEBOLD  2,330,872
TRAFFIC ANALYZER
Filed Dec. 7, 1940  8 Sheets-Sheet 3

INVENTOR
ANTON DIEBOLD.
BY
ATTORNEY

Oct. 5, 1943.  A. DIEBOLD  2,330,872
TRAFFIC ANALYZER
Filed Dec. 7, 1940  8 Sheets-Sheet 4

INVENTOR
ANTON DIEBOLD.
BY Victor D. Borst
ATTORNEY

Oct. 5, 1943.    A. DIEBOLD    2,330,872
TRAFFIC ANALYZER
Filed Dec. 7, 1940    8 Sheets-Sheet 5

INVENTOR
ANTON DIEBOLD.
BY
ATTORNEY

4 LANE ROAD.

3 LANE ROAD

2 LANE ROAD

Patented Oct. 5, 1943

2,330,872

UNITED STATES PATENT OFFICE 2,330,872

TRAFFIC ANALYZER

Anton Diebold, New York, N. Y., assignor to Signal Service Corporation, a corporation of Delaware Application December 7, 1940, Serial No. 369,047

8 Claims. (Cl. 234—12.5)

This invention relates to a method of and apparatus for analyzing traffic conditions at a definite location on a roadway, particularly a multiple-lane roadway.

It has heretofore been proposed to count the number of vehicles passing a given point in a definite interval of time to determine thereby their total number and to estimate their average speed, but from these facts alone, the condition of traffic is not capable of complete analysis.

An object of the present invention therefore is to analyze traffic conditions more completely than has heretofore been attempted.

To this end the method in its broader aspects consists in graphically indicating the relative lateral position of each vehicle as it passes a definite location on a roadway. More particularly the method further includes the making of a record, not only of the lateral position of each vehicle, but also the lane in which it is traveling and in which direction. The crossing of a vehicle from one lane to another is also indicated and the direction in which the vehicle was moving at the time of crossing.

While the method may be carried out in a number of ways, the present disclosure reveals one form of apparatus whereby the method may be carried out in an automatic manner. Such apparatus includes a detector laid across a roadway and over which the wheels of vehicles pass. In doing so certain electric circuits are closed or opened which in turn cause punch marks to be made in a moving web. Preferably the web is divided into lanes corresponding in a general way to zones of the roadway with which the web is designed to be used in analyzing the traffic conditions thereon. The web is driven at a uniform speed in any well known manner and a clock mechanism controls a punch which makes a record on the web at definite time intervals.

Many other features are included in the apparatus insuring accuracy of operation and these will be better understood by reference to the following description and claims taken in connection with the accompanying drawings in which:

General description

Figure 1:
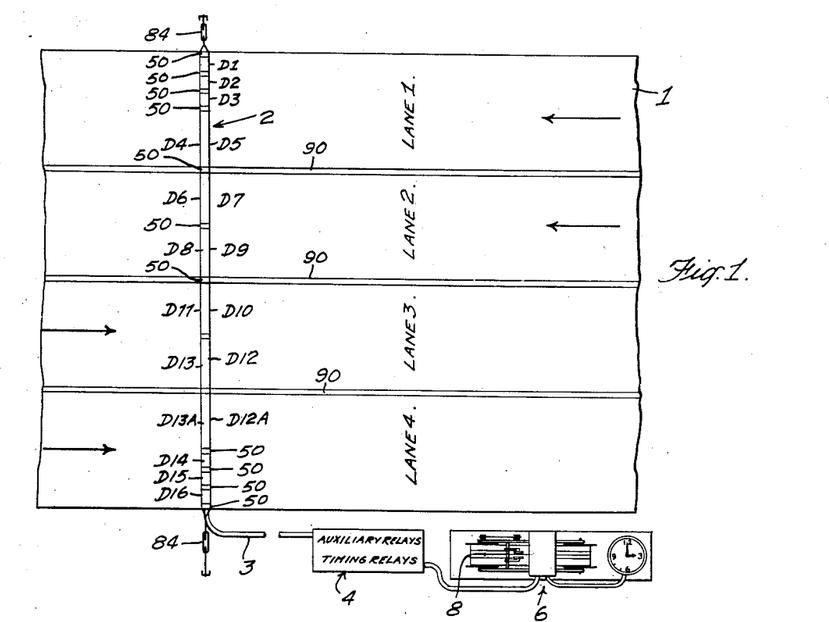
Figure 1 is a diagrammatic view of a four-lane roadway showing the detector extending transversely thereof with the recording unit and relays placed alongside of the road.

In Figure 1 a section of a four-lane roadway is indicated at 1 and across the roadway is placed a detector 2 over which the wheels of the vehicles pass. This detector is divided into sections some of which are rigid and act as housings for electrical contact devices. Other sections are resilient and when the vehicle passes across these resilient sections, certain contacts are made in the rigid sections. These contacts close circuits which pass along a cable 3 to a housing 4 containing auxiliary and timing relays which control the operation of a recorder 6. This recorder includes a web 8, Figure 6, which is moved forward at a uniform speed. The recorder contains a number of punches, which are actuated under control of punch magnets which are energized by the passing vehicles.

The web 8 is divided into lanes corresponding to the roadway with which it is to be used but the rulings do not constitute a miniature of the roadway. For instance, the zone separating one lane from another in the web is much wider than the usual white line separating the lanes in the roadway itself.

The method of analyzing traffic conditions consists in making a record of the relative lateral position of the vehicle on the roadway as it passes a definite location. In the present embodiment of the invention, the different lateral positions are recorded by the punch marks made in different lateral locations on the web. If a car crosses from lane 1 into lane 2, Figure 1, a mark is made in the web in the band or zone separating the two lanes.

The method also contemplates recording cars which are moving in the wrong direction.

Since the web 8 is moved at a uniform speed, it is possible by the location of the punch marks to gain an approximate idea of the density of the traffic at a particular time and the distribution of the cars on the roadway. The record made on the web also gives an indication of the reason for one car being in the same lateral position as another.

With this brief description of the results to be accomplished and a general suggestion of the means whereby these results are accomplished, it will be in order to describe the various parts in detail and their manner of cooperation.

*The recorder*

Figure 2:
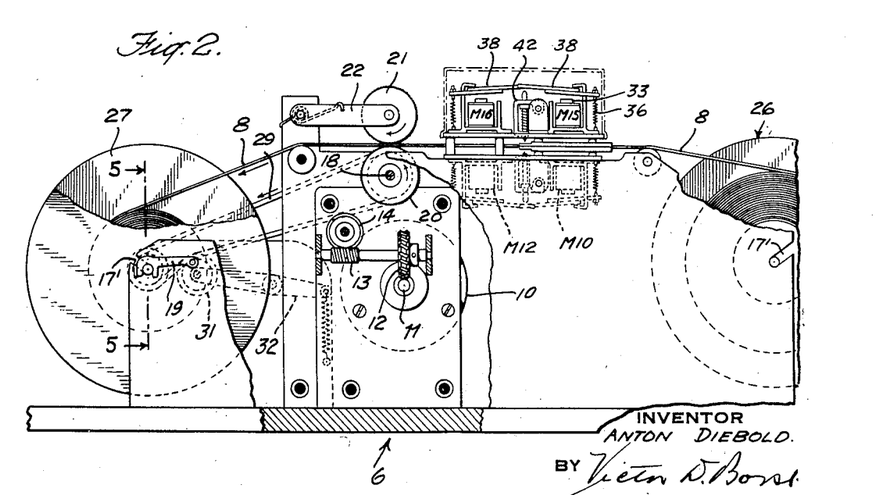
Figure 2 is an enlarged side elevation of the recording means.
Figures 3, 4, 5:
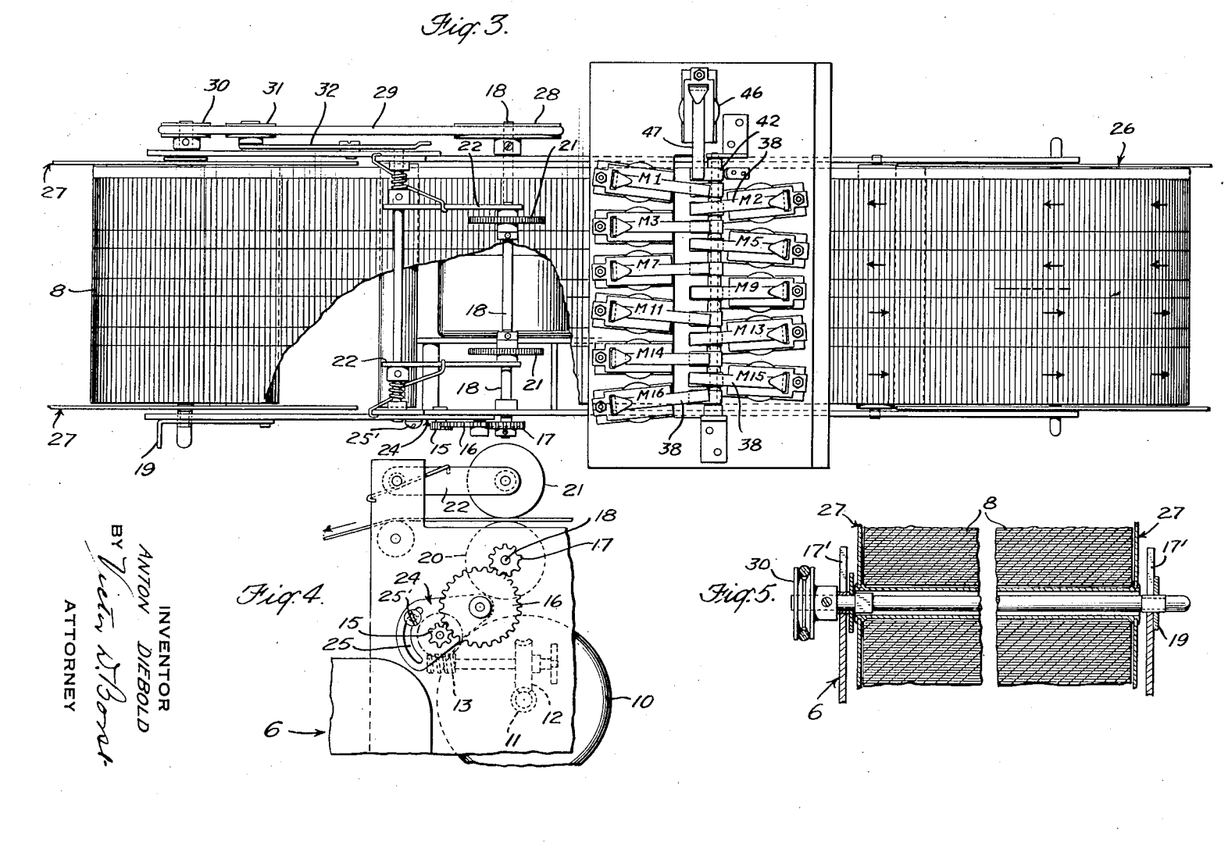
Figure 3 is a plan view of the recorder, on a still larger scale, with a part of the web broken away.
Figure 4 is a fragmentary side elevation showing the gears for driving the web.
Figure 5 is a fragmentary vertical sectional view of the take-up reel taken on the line 5—5 of Figure 2.

Referring to Figures 2 and 4, the recorder 6 includes a motor 10, Figure 4, the shaft of which carries a worm 11 engaging a worm wheel 12, the shaft of which carries a worm 13 meshing with at worm wheel 14 whereby pinion 15 is driven. This pinion meshes with a gear 16 engaging a pinion 17 on shaft 18. This shaft carries a pair of wheels 20, shown in dotted lines, Figure 4, for engaging and moving the web 8 in cooperation with upper wheels 21. These upper wheels 21 are carried by spring pressed arms 22, Figures 2, 3 and 4, and the peripheries of these wheels 20 and 21 are roughened somewhat so that the web is subjected to the necessary degree of friction to cause it to be advanced.

The gear 16 is mounted in an adjustable arm indicated at 24, Figs. 3 and 4. This arm pivots about the shaft upon which the pinion 15 is mounted and may be rocked about said shaft in order that different gears such as 16 may be used whereby the speed of the web may be varied. An arcuate 25 is provided in the arm 24 and a screw 25' is provided for holding the arm in its different positions. The web may be taken from a supply roller 26 and wound up upon a take-up roller 27. This latter roller is driven from a pulley 28 secured to the end of shaft 18, Figure 3, opposite to that to which pinion 17 is secured. An elastic band 29 passes over pulley 28 and over a pulley 30 secured to the shaft of the take-up roller 27. Any undesirable slack in the band 29 is compensated for by a pulley 31 carried by a spring pressed arm 32, Fig. 2. The side frames of the recorder are slotted at 17', Figs. 2 and 5, to enable convenient removal of rollers 26 and 27. A latch 19, Fig. 2, hooks over the shaft of roller 27 and holds it in place.

The various punches are situated adjacent the web between the supply and take-up rollers and each punch is actuated by an electromagnet. Some of these are shown in the section and some in top plan view, Fig. 6, and in elevation in Fig. 7. Since each of the electromagnets is of the same construction, it will be sufficient to describe one of them.

Figure 6:
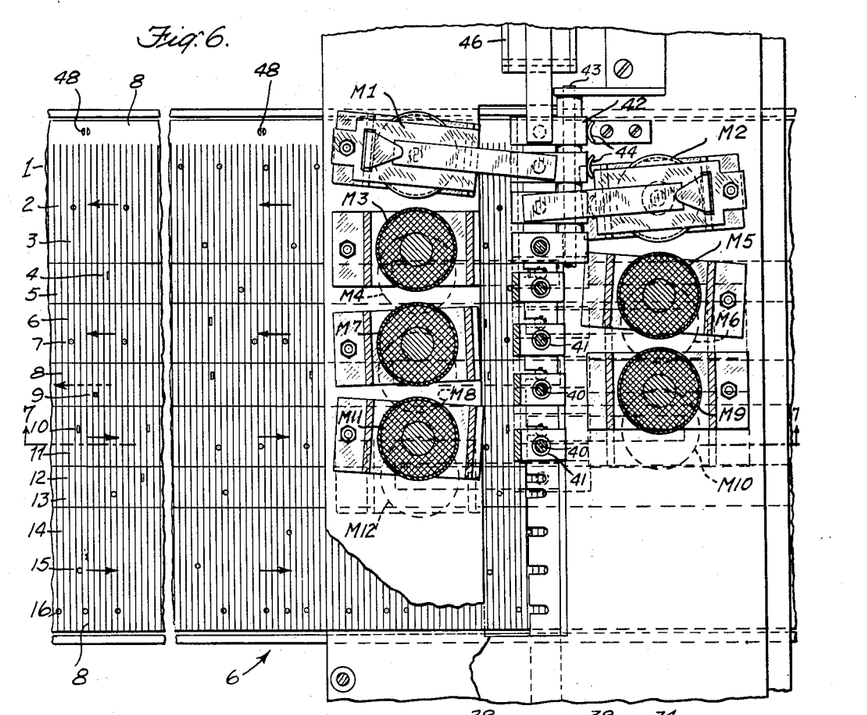
Figure 6 is a full size plan view of a portion of the recorder showing the web and the location of the magnets which operate punches to make appropriate marks in the web.
Figures 7, 8:
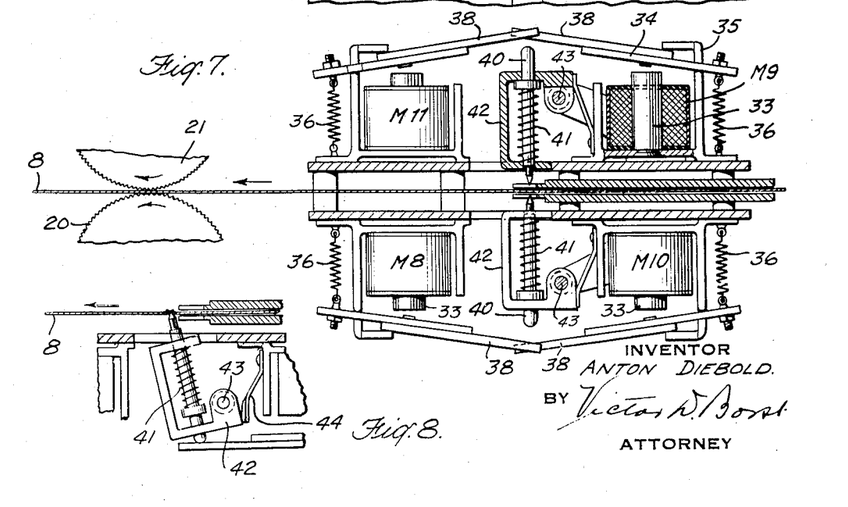
Figure 7 is a vertical longitudinal sectional view taken on the line 7—7 of Figure 6.
Figure 8 is a sectional view of a portion of the recorder shown in Figure 7, with parts in operative position.

Referring to Figure 7, each magnet consists of a core 33 about which is a suitable winding of insulated wire. An armature 34 supported for pivotal movement in a standard 35, is normally held by a spring 36 in the position shown in Figure 7. The armature has an extended portion 38 whose left-hand end as viewed in Figure 7, is located above the upper end of a punch 40. The punch is held in its normal position by a spring 41. When the electromagnet 33 is energized, the punch controlled thereby makes a hole through the web, which is moved underneath it, or on top of it as the case may be. As shown in Figure 7 some of the punches are arranged above the web and some below the web. For reasons which will later be better understood, the punches above the web make a characteristic mark, preferably a circular hole. The punches below the web make a rectangular punch hole. It may be stated at this time also that there are five punches below the web and their rectangular punch mark indicates that the vehicle registering it was moving in the wrong direction on the roadway. Each punch is carried by a bracket numbered 42, Figure 8, pivoted at 43. A spring 44 engages the bracket on one side of its pivot so that the punch is normally held in a vertical position. If, however, the punch is permitted to remain in engagement with the web while the latter is moving, the bracket 42 permits the punch to be rocked about the center 43 as shown in Figure 8 whereby it may to some extent follow the movement of the web. While this independent movement of the punch serves the general purpose of preventing any tearing of the web in case of misoperation, it also serves a definite purpose in the present embodiment of this invention due to the fact that in normal operations a punch is in contact with the web for approximately one second. The movement of the web, however, is relatively slow. With the gear wheels 16, Figure 4 of the relative size there indicated, the web moves the distance between the vertical lines shown in Figure 6 in 2½ seconds. A somewhat faster movement, however, would still be compensated for by the flexible mounting of the punch.

In addition to the sixteen punches controlled by the vehicles crossing the detector, there is an additional punch operated by a timing mechanism. The top of the electromagnet for operating this punch is indicated at 46, Figure 3 and its armature at 47. This punch makes two little semicircular marks at the side of the web as shown at 48, Figure 6.

For purposes of identification the various punch magnets will be indicated by M1, M2, M3, etc. The magnet to the left and at the top of Figure 6 is M1. The magnet at the top and to the right is M2. M3, M7 and M11 are in line with M1. M5 and M9 are in line with M2, Figure 6. M4, M8 and M12 are in line with M1 but are below the web. (See M3, Figure 7.) M6 and M10 are in line with M2 but are below the web. M13, M14, M15 and M16 are not shown in Figure 6 because in this figure some parts are broken away but are shown in Figure 3. All of these magnets, however, are situated above the web and all of them will be referred to more in detail as the description proceeds.

The detector

Figure 9:
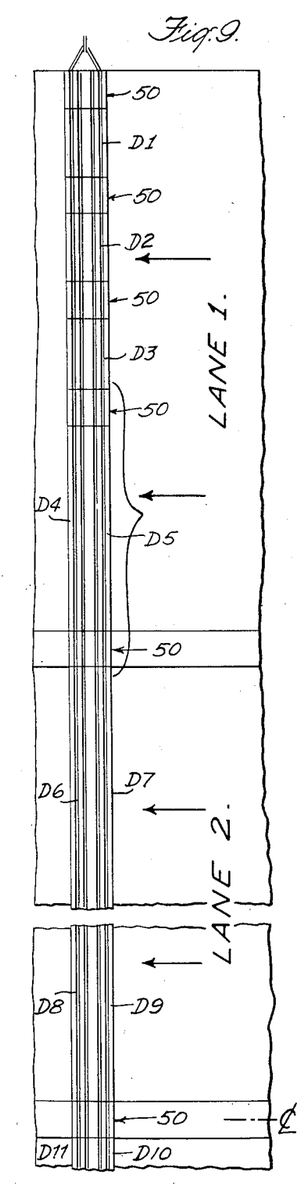
Figure 9 is a fragmentary plan view of the right portion of the detector as shown in Figure 1.
Figure 13:
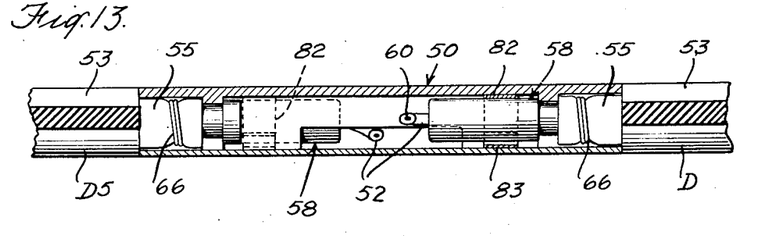
Figure 13 is a similar sectional view on the line 13—13 of Figure 11.
Figure 14:
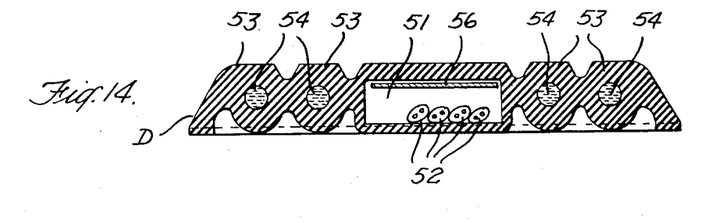
Figure 14 is a transverse sectional view on the line 14—14 of Figure 10.

The detector 2 has previously been referred to as comprising rigid sections and resilient sections. Referring now to Figure 9, the rigid sections are indicated by the reference character 50 and between each of these rigid sections is a resilient section. Since it is the resilient sections which respond to the pressure of the wheels of vehicles passing across the detector, each of these resilient sections have been designated, in Figure 1, as D1, D2, D3, etc. Not only do these designations apply to the resilient portions of the detector, but likewise to circuits which are closed when a car passes in either direction over the detector at a particular resilient section. The resilient sections are preferably composed of rubber and in cross section are shaped as indicated in Figure 14. Each of these sections as shown in Figure 14 is provided with a central chamber 51 for the reception of electrical conduits indicated generally by reference character 52. At each side of the central chamber are two housings 53 centrally bored at 54. These bores form conduits for a liquid, such as water or oil. Whenever the wheels of a car pass over a resilient section, in either direction, the housings 53 are depressed causing the liquid to act against a switch operating structure contained in one or another of the rigid sections 50. The housings 53 terminate in the form of rubber tubes 55, Figure 13, extending a short distance into a rigid section 50 where they connect with the switch operating structure.

Figure 10:
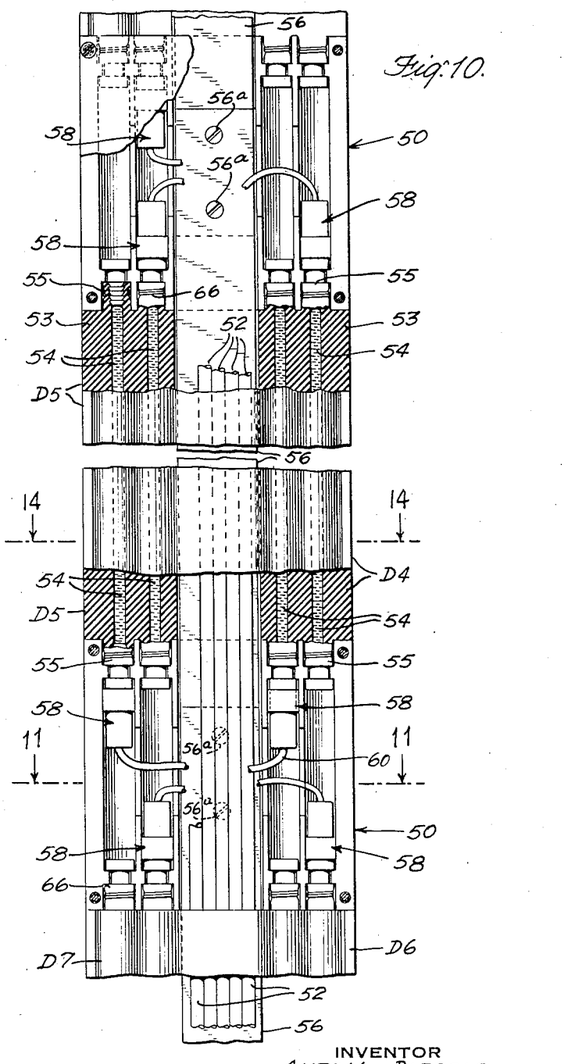
Figure 10 is an enlarged sectional view of the portion of the detector within the bracket of Figure 9, viewed from the underside and with certain parts broken away.
Figure 11:
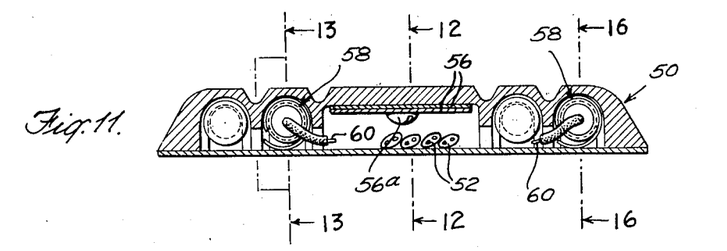
Figure 11 is a transverse sectional view through the detector on the line 11—11 of Figure 10.
Figure 12:
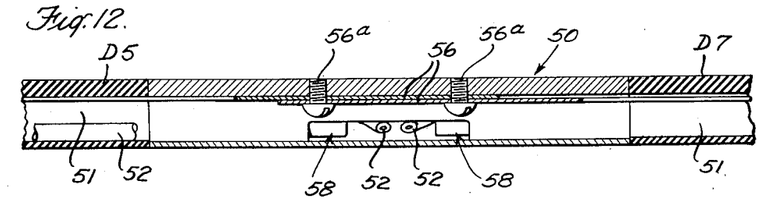
Figure 12 is a longitudinal sectional view through the detector taken on the line 12—12 of Figure 11.

Figure 10 shows a resilient section and two adjacent rigid sections on an enlarged scale. The rigid sections are similar in cross-section to the resilient sections which will be clear from Figures 11 and 14. A divided plate 56 of electrical conducting material passes through the central chamber of each rigid section and a resilient section, said plate being connected to one terminal of a source of electrical current. This divided plate also joins all rigid and resilient sections by means of short strips, terminating and overlapping at each rigid section and secured thereto by two screws 56a. In this way detectors can readily be made up for highways having different number of lanes. A switch operating structure is indicated generally by the reference character 58. Figure 10, and when a car passes over a resilient portion of the detector, two switches are operated, but these switches are connected in parallel and but one electrical circuit is closed. The reason for having two switches under control of each car is in order that there may be no misoperation of a switch due to the rapid passage of a car over the detector or to other causes which might permit one switch to operate and not another. The two switches serve as an additional factor of safety.

Referring to Figure 10 and assuming that a car passes over the detector in the direction of the arrow of Figure 9, upon striking the right-hand housing 53 as shown in Figure 14, the upper right-hand switch operating structure 58 is actuated to operate a switch which closes a circuit including wire 60. As the car passes over the left-hand housing 53, the lower left-hand switch operating structure 58 is actuated to close a circuit including wire 60 but these two wires are joined together so that only one circuit is closed. In other words, for each resilient section of the detector, there are provided two switch operating structures located in the rigid sections adjacent such resilient section and this is repeated throughout the detector.

Switch operating structure

Figures 15, 16, 17:
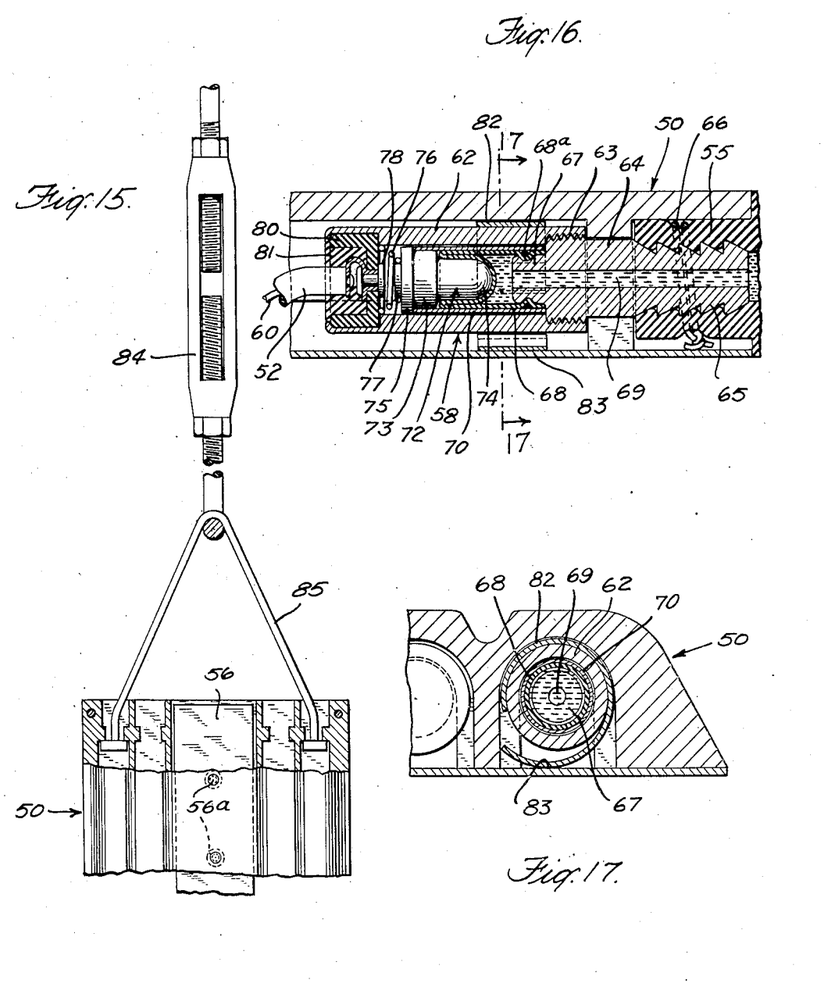
Figure 15 is a fragmentary portion of one end of the detector showing the turnbuckle fastening means.
Figure 16 is an enlarged sectional view of one of the switches taken on the line 16—16 of Figure 11.
Figure 17 is a transverse section taken on the line 17—17 of Figure 16.

The switch operating structure is shown in enlarged detail in Figure 16. Here the end 55 of a rubber tube leading from a resilient section is shown as extending into a rigid section 50. The switch operating structure itself includes a centrally bored cylindrical housing 62 having interior screw threads 63 at its right-hand end. A coupling 64 provides a water-tight connection between the end 55 of the rubber tube, and the housing 62. The right-hand end of this coupling is slightly corrugated as indicated at 65 and this corrugated portion extends within the tube 55. A wire 66 wrapped tightly around the rubber tube secures the coupling to it, thereby providing a water-tight joint.

The opposite end of the coupling 64 has screw threads which engage the threads 63 of the cylindrical housing 62, and also a reduced cylindrical portion 67 which extends within the central bore 62, the portion 67 having a circumferential groove. A rubber nipple 68 is fitted over the portion 67 and secured by a wire 68a whereby a water-tight joint is provided between the member 67 and the rubber nipple. The coupling 64 is centrally bored at 69, this bore aligning with a conduit 54, Figure 14, in the resilient portion of the detector whereby the liquid is conveyed to the inside of the rubber nipple. A sheath 70 is fitted over the nipple after the latter has been secured to 67, this sheath acting to prevent undue outward expansion of the nipple under pressure of the liquid during the passage of a car. To secure this result the sheath has an interior diameter which is only slightly greater than the exterior of the nipple.

A switch closing member 72 is provided with a cylindrical portion 73 of such diameter that it makes a sliding fit within the sheath 70. The right-hand end of the switch closing member is rounded at 74 and when this member is placed within the sheath, the nipple 68 is invaginated or folded inwardly upon itself as clearly shown in Figure 16. The left-hand portion of the member 72 is provided with a shoulder 75 which abuts the end of the sheath, and limits the right-hand movement of the switch closing member under action of spring 76, which spring normally tends to open the circuit which the member 72 closes when an impulse is imparted to the liquid in one or another of the conduits 54. The actual closing of a circuit occurs when the end 77 of the member 72 contacts with the stationary portion 78 of the switch. When this occurs a circuit is closed through wire 60, a portion of which is shown in Figure 16. The stationary member 78 of the switch is carried by a cup-shaped member 80 of insulating material and a seal 81 of plastic material prevents ingress of water, oil or dirt.

In order that the current may pass to the plate 56 from wire 60 when the switch operating member 72 is actuated, the member 62 is provided with a spiral spring piece 82 which makes electrical contact with 62 and with the metal portion of a rigid section 50 at the point 83, Figure 17. The circuit from wire 60 is completed through one or more relays which will later be described in detail.

The detector is held in position on the roadway and given the necessary tension by means of a turnbuckle 84, one at each end of the detector and connected to each end section 50 by V-shaped members straps 85 (Fig. 15). The turnbuckles are secured to some rigid part at the sides of the roadway.

Referring now to Figure 9, it is to be noted that when a car crosses the detector at sections D1, D2, or D3 in the direction of the arrows, switches corresponding to these sections of the detector are actuated due to the car passing over portions 53 which appear on the right of the central chamber 51 in the sectional view of Figure 14. There are, however, no switches actuated as the car passes the central chamber portion of the detector as shown in Figure 14, nor as it passes over the portions 53 to the left of this central chamber portion. This one side or one way actuation is true also of sections D14, D15, and D16 at the opposite end of the detector, but in the opposite direction. In all of the sections in between, however, switches are closed when the car passes either way, that is, when it crosses the left-hand portion of the detector as well as when it crosses the right-hand portion thereof as viewed in Figure 14. If, for instance, a car passes section D4—D5, Figure 9, it actuates switches appropriated, respectively, to both D4 and D5. Hence between D3 and D14 two sets of switches are actuated. This provides for detecting cars crossing the detector in both directions, or crossing from one lane to another either in the wrong direction or in the proper direction.

*Circuits and relays for controlling the punches*

Before describing these circuits and relays in detail, it may be desirable preliminarily to point out that if a car is going in the direction of the arrow in lane 1, Figure 9, with its right wheels passing over D1, then a punch will be made in the web in column 1, Figure 6, indicating the relative lateral position on the road of such a car at the time of crossing the detector.

If a car crosses in lane 1 at D2, Figure 2, a punch is made in column 2 of the web, Figure 6. If, however, a car crosses the line 90, usually a white line, dividing lane 1 from lane 2, a punch mark is made in column 5 of the web, Figure 6, indicating that the car had crossed the white line but was still going in the proper direction. A punch mark in column 4 of Figure 6 would indicate that the car coming in the opposite direction had crossed the line 90. In general it may be stated that the circuits and relays about to be described in detail, determine the column on the web where a punch mark is to be made and the character of such mark.

Figure 18:
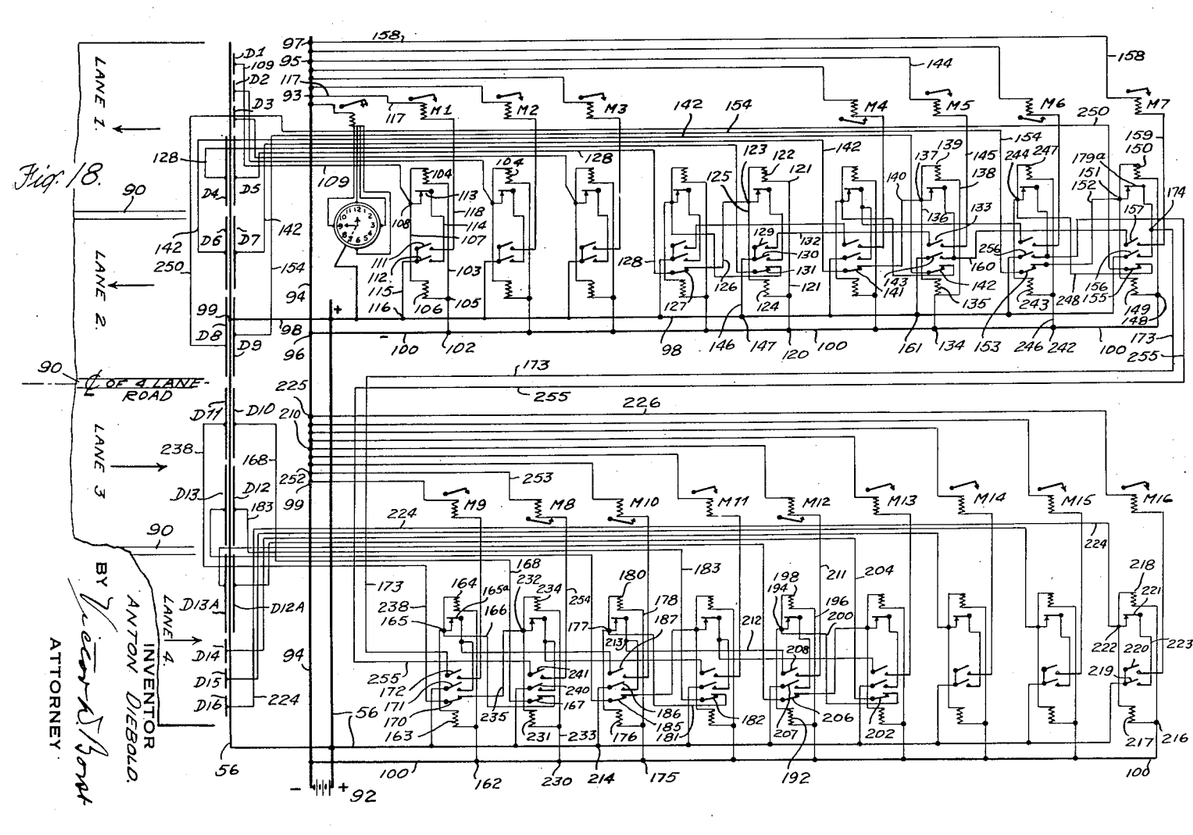
Figure 18 is an electric wiring diagram.

The various circuits or relays are shown in Figure 18 which is not only a wiring diagram but also shows diagrammatically the position of the resilient sections on the detector and the switches or contacts closed by a car passing the detector in one direction or the other. The several lanes are also indicated in Figure 18 and the direction of traffic in these several lanes.

A source of current, which is diagrammatically indicated as a battery, is shown at 92, Figure 18, and the conducting plate 56 is shown as connected to the positive side of this battery. When a car crosses the detector in such a position that its right-hand wheels close a circuit at D1, magnet M1 is energized and a punch mark is made in the web in column 1, Figure 6, as already stated.

The circuits made active may be traced as follows: From the negative side of the battery, current passes along the main line 94 to junction 96, thence along branch line 100 to junction 102, thence along wire 103 to relay 104. It also passes from junction 105 to relay 106, thence through wire 107 to junction 108 to which latter junction also leads a wire from relay 104. From junction 108, the current passes along wire 109 to D1 and back through 56 to the positive side of battery 92.

The contact at D1 is closed only momentarily by a car crossing the detector and the resulting circuit is therefore immediately opened at D1. In order, however, to give time for the punch to be operated, and furthermore to prevent the hind wheels of a car from causing a second operation of the same punch thereby erroneously counting two cars when only one has passed, a holding circuit is provided. This holding circuit is under control of relays 106 and 104 which relays are in parallel.

Relay 104 is a delayed action relay and does not act for an interval of one second. Relay 106 closes contacts at 111 and 112. Contact 112 is the holding switch for detector switch D1 because D1 closes only momentarily. Contact 112 closes this holding circuit which flows from junction 102 to relay 104 to junction 108, thence through contact 113 which has not yet been opened by 104 and therefore permits current to flow to wire 114 through contact 112 which has been closed by relay 106, the current then passing to wire 115 connected to a branch line 98, the latter connected at junction 99 to 56.

The closing of contact 111 establishes a circuit through M1 which causes a punch mark to be made in column 1 of the web as shown in Fig. 6. This circuit starts from the negative side of battery 92, passes along main wire 94 to junction 93 thence along wire 117 to M1. From M1 it passes along wire 118 through contact 111 to wire 115, to junction 116. From junction 116 it passes along wire 98 to junction 99 on the conductor strip 56. After the elapse of about one second the relay 104 automatically opens contact 113 thereby breaking the circuit to relay 106 resetting it for a new cycle.

If a car passes across section D2 thereby closing contacts appropriated to this section a circuit similar to that described in connection with D1 is established. This causes a circuit to be closed through punch magnet M2 which makes a punch mark in column 2 on the web as shown in Fig. 6.

If a car passes across section D3 a circuit is established through punch magnet M3 causing a punch mark to be made in column 3 of the web as shown in Fig. 6.

In the foregoing the right wheels of the car have been considered and it will now be in order to describe what happens by reason of the left wheels crossing the detector. The distance from the rigid section 50 to the left of D3, Figure 9, to the white line 90 is not sufficient to permit a car to pass with both its right and left wheels beyond this rigid section and wholly within lane 1. Therefore, when the right wheels pass at D3, the left wheels are within the white line dividing lane 1 from lane 2, and cross the detector at D5—D4, Figures 9 and 18. The left wheels do not cause any punch marks to be made under these conditions. The left wheels close detector switch D5 and almost immediately thereafter switch D4. The closing of D5 will cause a momentary flow of current as follows: From junction 120 on branch line 100, current may flow along wire 121 to relay 122 to junction 123. It may also flow from 120 through relay 124 and wire 125 to junction 123. From this junction it flows along 126 to contact 127, which is closed. Thence it goes along wire 128 to D5 which is momentarily connected to 56. Relay 124 causes contacts 129 and 130 to be closed but opens contact 131. Contact 130 closes a holding circuit such as that previously described. Contact 129, while moved to closed position by relay 124 is nevertheless without effect because wire 132 leads to an open contact at 133. Thus the left-hand wheels closing contacts at D5 have had no effect.

As these wheels pass over the detector and close contact D4, no effect is produced because contact 131 has been opened by relay 124.

If, however, a car crosses the white line 90, Figure 1, dividing lane 1 from lane 2, then the right-hand wheels close detector switches D5—D4 and the left-hand wheels close switches at D7—D6. The circuits effected by the closing in succession of D5—D4 have just been described.

When D7 is momentarily closed, current flows as follows: From junction 134 in branch line 100, current passes to relay 135, along wire 136 to junction 137. It also flows from 134 along 138 through relay 139 to junction 137. From this junction it flows along wire 140 to contact 141. This contact is closed so that current may pass to wire 142 to D7 and thence to the supply strip 56. When relay 135 is energized it breaks contact 142 in a circuit leading to D6 which therefore nullifies the action of that contact even though such contact is closed when a car passes the D6 section of the detector.

Relay 135, however, closes contacts 143 and 133. Contact 143 closes a holding circuit through relays 135 and 139. Contact 133, however, completes the circuit which was partially completed by the car closing D5 so that current may now flow to punch magnet M5. This circuit may be traced as follows:

From the supply line 94 to junction 95, thence along wire 144 to punch magnet M5, thence along wire 145 through contact 133 which is at this time closed, thence along 132 to contact 129 which is also closed, thence along wire 146 to junction 147 in branch line 98.

Thus a car whose right wheels pass section D5—D4 and its left wheels D7—D6 causes punch M5 to be operated and a mark is made in the band of the web separating lane 1 from lane 2. As previously described this band is much wider in proportion than the white line 90 on the road in order that there may be sufficient room for the punches to make the appropriate marks in such band. In the web as actually used, the bands representing the division between the lanes are colored red while the main body of the web is white. This of course is a mere arbitrary distinction, as a matter of convenience, as other distinctive colorings may be used.

It is to be noted that the punch marks made by the magnets M1, M2, M3 and M5 are round marks indicating that the car is going in the right direction but the fact that M5 is made in the road band separating lane 1 from lane 2 indicates that that car has crossed from one lane into another or was partially in lane 2 at the time of crossing the detector.

In the description so far no actuation of M4 has occurred. It will be recalled that this punch is below the web and makes a characteristic punch mark which in the present embodiment is in the form of a small rectangle and such a mark if made by magnet M4 would indicate that a car which should be in either lane 4 or lane 3, had crossed the detector with its left wheels in lane 1. The circuits controlling the operation of this punch M4, will later be described.

If a car crosses the detector wholly within lane 2, then contacts D7—D6, and contacts D9—D8 are each successively closed by such car. The closing of D7—D6 by the right wheels will cause the circuits already traced to be effective including the closing of contact 143.

The closing of contact D9 will cause circuits to be closed as follows: From junction 148 in branch line 100, current passes to relays 149 and 150 to junction 151. From junction 151 it flows along lead 152 to contact 153 which is at this time closed. Then it goes along wire 154 to D9, thence to strip 56. Relay 149 breaks the contact 155 which nullifies D8. Relay 149 however makes contacts 156 and 157. Contact 156 is in the holding circuit. Contact 157, however, closes a circuit including magnet M7. This circuit runs as follows: From main line wire 94 to junction 97, thence along wire 158 to magnet M7, along wire 159 to contact 157 thence along 160 to contact 143. The latter contact is closed having been so moved as the right wheels of the car closed D7 causing relay 135 to become energized. From contact 143, current flows to junction 161 connected to the supply line 98.

Each car crossing the detector in lane 2 will therefore cause magnet M7 to produce its punch mark in the web.

So far all cars have been assumed to be going in the direction of the arrows, either in lane 1 or lane 2.

If a car going in the direction of the arrow in lane 2 should cross the white line 90 dividing lane 2 from lane 3, such a car may be said to be going partially in the wrong direction, since its left wheels are in lane 3, although its right wheels are in lane 2. The red band of the web, therefore, dividing lane 2 from lane 3, may be considered as a sort of neutral zone in which cars going in either direction are partly right and partly wrong and by reference to Figure 6 it will be noted that a round mark is recorded in this central band where a car has crossed this band going in the proper direction for lanes 1 and 2 but that a rectangular mark is also shown in said band indicating that a car has crossed the center line of the roadway coming from the direction appropriated to lanes 3 or 4.

The circuits brought into operation by a car crossing the white line separating lane 2 from lane 3 but going in the general direction appropriated to lane 2 will now be described.

The right wheels of such a car will act on contacts D9 and D8 and the left wheels on contacts D10—D11. The closing of D9 will act on the switch system as above described and nullify D8.

The closing of D10 will have the following result. From junction 162 (lower portion of Figure 18) current flows through relays 163 and 164 to junction 165. From 165 it passes to wire 166 and through switch 167, which is closed. It may then pass along wire 168 to D10 which was closed momentarily as the car passed over the detector in this zone. Current then passes back to the main conducting strip 56.

Relay 163 breaks contact 170 which nullifies D11. This relay, however, closes contacts 171 and 172. Contact 171 closes the holding circuit for relays 163 and 164. Contact 172 closes a circuit through magnet M9 which makes a round punch in the central red band of the web at column 9 indicated in Figure 6.

The current supplying M9 may flow from main wire 94 to junction 99 thence through magnet M9 to contact 172, to wire 173 to junction 174 (upper part of Figure 18). From 174 current flows through switch 174a which switch is closed at this time. Therefore current may flow to junction 151 and through wire 152, through switch 153, to D9. In this connection it is to be remembered that D9 and D10 are closed at the same time and since relay 150 is a delayed action relay, the contact 174a is not opened for one second, even though contact at D9 has been opened by a car having crossed the detector with its front wheels.

It may be mentioned that all of the upper relays such as 104, 122, 139, etc., are all delayed action relays acting to open the contacts which they control only after a period of one second. This, as previously pointed out, is for the purpose of preventing the rear wheels of a car from making a punch mark. With a delay of one second only one car is counted unless such car is proceeding at a very slow pace.

In this connection also it may be recalled that the mounting of each punch on bracket 42, Figures 7 and 8, permits the punch to follow the movement of the web while the punches are in engagement with the web and this engagement lasts approximately one second.

If a car straddles the white line between lanes 3 and 4 going in the direction appropriated to lanes 1 or 2, then contacts D12 and D12a are closed at the same time. As the car passes over the detector, contacts D13 and D13a are also momentarily closed.

Closing of D12 causes current to flow from junction 175 to relay 176 to junction 177. It also flows from 175 along wire 178 to relay 180, to junction 177. From 177 it flows along 181 to contact 182, which is closed. It then flows along 183 to D12, thence back to conductor strip 56. Relay 176 breaks contact at 185 and closes contacts 186 and 187. 186 closes holding circuit for the relays 176 and 180. At the same time that switch D12 is closed, switch D12a is also closed and current goes from junction 190 to relay 192 to junction 194, also passes along wire 196 to relay 198 to junction 194. From this junction it also passes to wire 200 and through this wire to contact 202 which is closed, allowing current to pass along wire 204 to D12a and back to line wire 56.

Relay 192 opens contact 206 leading to D13a thereby nullifying the contact made at this point. Said relay, however, closes contact 207 and contact 208. Contact 207 closes a holding circuit for relays 192 and 198. Contact 208, however, closes a circuit including punch magnet M12. The circuit for this magnet may start at junction 210 in line wire 99 and pass through M12, thence along wire 211 to contact 208. It then passes along wire 212 to junction 213, which junction it will be remembered is in the holding circuit including contact 186. The current therefore passes through contact 186 to junction 214 at line wire 56.

No provision is made for a car which normally should travel in lanes 1 or 2 going so far to the left as to cross the detector at D14, D15 or D16. These sections have switch actuating means operated when a car crosses the detector in the direction of the arrows appropriated to lanes 3 and 4 only. This is likewise true of sections D1, D2 and D3 for cars going in the opposite direction.

It will be now in order to describe the circuits rendered operative by cars crossing the detector in lanes 3 and 4 in the direction of the arrows appropriated to those lanes.

When a car crosses the detector at section D16, a circuit is closed which is substantially a duplicate of that closed when a car passes along lane 1 with its right wheels closing D1.

The circuit closed by crossing at D16 flows from the battery 92 along branch wire 100 to junction 216 (extreme right, Figure 18). From here it goes through relays 217 and 218, to junction 222. Relay 217 closes contacts 219 and 220 and relay 218 is, like all of these upper relays, a deferred action relay and does not act to break the circuit at contact 221 until the lapse of one second of time. Therefore with 221 closed and 219 closed, current may pass from 216 through 217 to junction 222 thence through contact 221 along wire 223 to contact 219. Here it connects to wire 56 and the circuit through relays 217 and 218 is held. From junction 222 the current also goes by way of wire 224 to D16 which has momentarily been closed by a car. Even though this circuit is immediately opened, relay 217 holds contacts 220 closed and this causes a current to be established through M16. This current may be traced as follows: From junction 225 on wire 94 current passes along wire 226 to magnet M16 and through said magnet and contact 220 to line wire 56.

When a car crosses at D15 or D14 circuits similar to that just described are established and magnet M15 or magnet M14, as the case may be, is actuated and a punch mark is made in the proper column on the web 8, Figure 6.

If a car crosses the white line between lane 4 and lane 3, going in the direction of the arrows in these lanes, then magnet M13 is actuated thereby making a punch mark in column 13 of the web 8, Figure 6. This punch M13 indicates that this car crossed the white line dividing the two sections.

It is thought to be unnecessary to describe in detail the operation of the relays by which this circuit through M13 is established since the circuits and relays are similar to those already described in connection with the operation of M5.

If a car is wholly within lane 3 then punch 11 is operated, the circuits concerned being similar to those described in connection with the operation of punch M7.

If a car passes from lane 3 across the white line into lane 2 then punch 8 is operated.

Since the circuits brought into operation under these conditions do not have their exact analogy in other circuits which have already been described, the circuits brought into operation at this time will be traced.

Referring to Figure 18, the passage of the car straddling the center line between lanes will actuate contacts D11—D10 and D8—D9. When contact D11 is established current may pass from junction 230 in branch line 100 to relay 231 to junction 232. It also passes along wire 233 through relay 234 to junction 232. From junction 232 it passes along wire 235, through contact 178, which is closed. It may then pass to wire 238 to contact D11 and thence to supply wire 56. Relay 231 breaks contact 167 and closes contacts 240 and 241. Contact 240 is in the holding circuit for relays 231 and 234. Contact 241 in conjunction with contact closed at D8 closes a circuit including magnet M8. The circuit closed by a car passing at D8 may be traced as follows: From junction 242 in branch line 100, (see the upper portion of Figure 18), current passes to relay 243, to junction 244. From junction 244 it passes along wire 248 to contact 155 which is closed. Therefore it passes through said contact to wire 250 connected to D8. Current under these conditions may pass from junction 252 in line wire 99 along wire 253 to magnet M8; thence along wire 254 to contact 241 which was closed when the switch at D11 was closed. Therefore the current passes through switch 241 to wire 255 to contact 256 which has been closed by actuation of relay 243. The current then passes through 256 to wire 257 to junction 258 in branch line 98, thus completing the circuit through magnet M8, and causing a punch mark to be made in column 8 of the web as shown in Figure 6.

It will be noted that this punch mark is a rectangular one indicating that the car was going in the wrong direction, although as previously pointed out, this middle zone is one in which a car going in either direction would be partially wrong. However, in order to distinguish between cars crossing the white line between lanes 2 and 3 going in the direction of lanes 1 and 2 and from those going in the direction of lanes 3 and 4, the two marks made by the punches are different.

If a car in lanes 3 or 4 crosses completely into lane 2, then magnet M6 is actuated and a rectangular punch mark is made in column 6 of the web as shown in Figure 6. It is believed unnecessary to trace this circuit because it is similar in all respects to that causing the actuation of magnet M10. Similar remarks may apply also to magnet M4 which indicates that a car has crossed the white line between lanes 2 and 1, but having come from the direction appropriated to lanes 3 and 4, the circuits actuated are similar to those actuated in connection with M12.

*Brief review of operation*

The operation of the system is believed to have been made clear by the foregoing detailed description. However, it is thought that a brief review of the operation in terms of function rather than in terms of mechanism may be helpful. In this brief review, reference is made particularly to Figures 19, 20 and 21.

Figure 19:
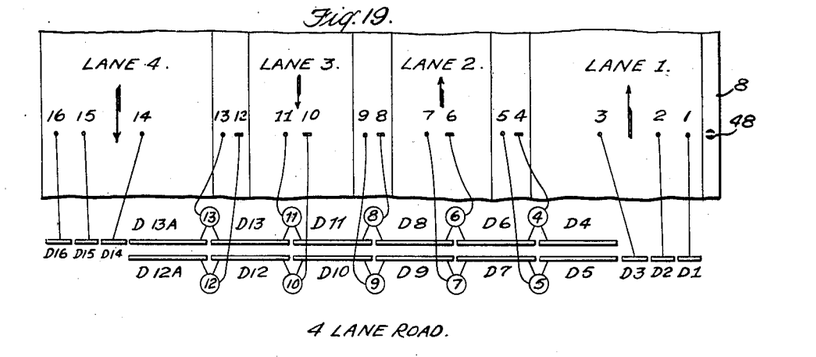
Figure 19 is a diagrammatic illustration of the web and the controlling detector for a four-lane roadway.

Figure 19 shows a portion of the paper web 8 as ruled for a four-lane roadway. Below this fragmentary portion of the web are diagrammatically shown the several contacts on the detector which contacts are momentarily closed as a car passes over the detector. The various punch marks made in the web are consecutively numbered from left to right. The lines drawn from columns 1, 2 and 3 and columns 14, 15 and 16 to detector sections D1, D2, D3 and D14, D15 and D16, respectively, indicate that a punch mark is made in the web when a car passes over these respective sections. If a car, however, passes with its left wheels across the white line 90, dividing lane 1 from lane 2, detector switches D5—D4 and D7—D6 are brought into action and a punch mark is made in the band of the web between lane 1 and lane 2. Here a line is drawn to a circle, the circle indicating a punch magnet and the character of the punch mark made by such magnet is shown in the band between the two lanes.

If a car crosses the white line between lanes 1 and 2, the punch magnet 5 is actuated and a round hole is made in the band in column 5 of the web as shown in Figure 19. If a mark is made in column 4, it indicates that such car had crossed the white line dividing lanes 1 and 2 but had come from the other direction, either from lane 3 or from lane 4.

The rectangular punch mark in column 6 of the web indicates that a car had come from lane 3 or lane 4 into lane 2. That is to say, such a car crossed the detector in the wrong direction. Similar marks in lanes 3 and 4 indicate by the character of the mark and the column in which it appears on the web the lane in which a car crossed the detector and the direction in which it was traveling at the time of crossing.

Figure 20:
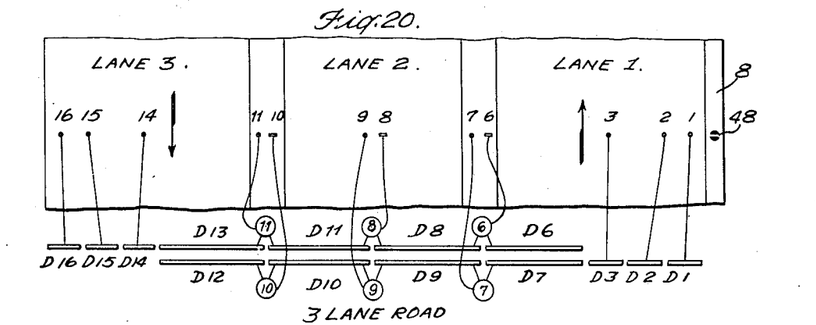
Figures 20 and 21 are similar views of the web for a three-lane roadway and for a two-lane roadway respectively.

Figure 20 shows diagrammatically the ruling of the web 8 for a three lane roadway which differs from the four lane merely in that fewer punches are necessary, the interpretation of the marks made in the web following the same law as in Figure 19.

Figure 21:
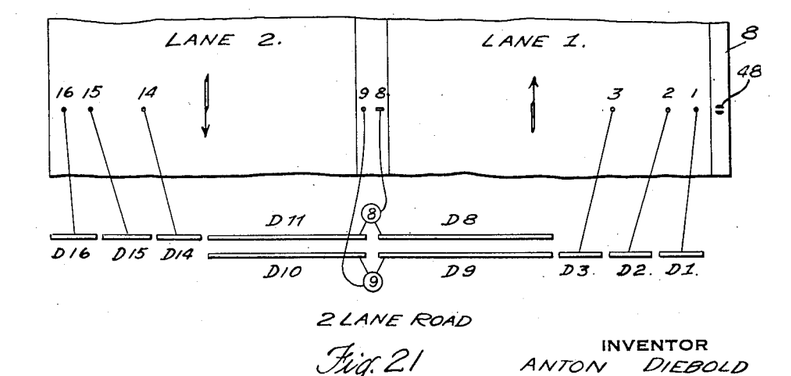

Figure 21 shows a two-lane roadway in which there is only one punch M8 showing wrong direction. In other words if a car is in lane 2 and crosses the white line dividing this lane from lane 1, punch M8 would be actuated and a rectangular mark shown in column 6 of the web would be punched.

Likewise a car passing from lane 1 across the white line dividing this lane from lane 2, would cause magnet M9 to be actuated and would make a round punch in column 9 of the web indicating that such car came from lane 1 across the white line either partly or wholly into lane 2.

While the foregoing description illustrates one practical embodiment of the method and apparatus for analyzing traffic conditions on a roadway, it is obvious that variations may be resorted to within the scope of the appended claims without departing from the spirit of the invention and that parts of the structure may be used without others.

What I claim is:

1. Means for recording the passage of traffic over a roadway comprising a record strip, means for moving said record strip at a uniform speed, means for marking said record strip to graphically indicate the lateral position of a vehicle on the roadway and means engageable by a vehicle for rendering said marking means operative, said last mentioned means comprising a contact strip extending across the roadway and over which a vehicle may pass, a pair of circuit closing means in said contact strip which are successively actuated by a vehicle crossing said contact strip in either direction, and means for rendering either one of said circuit closing means ineffective when the other has first been actuated.

2. Means for recording the passage of traffic over a roadway comprising a record strip, means for moving said record strip at a uniform speed, means for marking said record strip to graphically indicate the lateral position of a vehicle on the roadway and means engageable by a vehicle for rendering said marking means operative, said last mentioned means comprising a contact strip extending across the roadway and over which a vehicle may pass, circuit closing means in said contact strip which are actuated by the front wheels of a vehicle crossing said contact strip and means preventing a second actuation of said circuit closing means by the rear wheels of said vehicle.

3. Means for recording the passage of traffic over a roadway comprising a record strip, means for moving said record strip at a uniform speed, means for marking said record strip to graphically indicate the direction of movement of a vehicle on the roadway and means engageable by a vehicle for rendering said marking means operative, said last mentioned means comprising a contact strip extending across the roadway and over which a vehicle may pass, a pair of circuit closing means in said contact strip which are successively actuated by a vehicle crossing said contact strip in either direction, and means for rendering either one of said circuit closing means ineffective when the other has first been actuated.

4. Means for recording the passage of traffic over a roadway comprising a record strip, means for moving said record strip at a uniform speed, means for marking said record strip to graphically indicate the direction of movement of a vehicle on the roadway and means engageable by a vehicle for rendering said marking means operative, said last mentioned means comprising a contact strip extending across the roadway and over which a vehicle may pass, circuit closing means in said contact strip which are actuated by the front wheels of a vehicle crossing said contact strip and means preventing a second actuation of said circuit closing means by the rear wheels of said vehicle.

5. Means for recording the passage of traffic over a roadway comprising a record strip, means for moving said record strip at a uniform speed, means for marking said record strip to graphically indicate the lateral position and the direction of movement of vehicles on the roadway, and means engageable by vehicles on the roadway for rendering said marking means operative, said last mentioned means comprising a contact strip extending across the roadway and over which vehicles may pass, a pair of circuit closing means in said contact strip which are successively operated by the front wheels of vehicles crossing said contact strip in either direction, and means for rendering either of said circuit closing means ineffective when the other thereof has first been actuated.

6. Means for recording the passage of traffic over a roadway comprising a record strip, means for moving said record strip at a uniform speed, means for marking said record strip to graphically indicate the lateral position and the direction of movement of vehicles on the roadway, and means engageable by vehicles on the roadway for rendering said marking means operative, said last mentioned means comprising a contact strip extending across the roadway and over which vehicles may pass, a pair of circuit closing means in said contact strip which are successively operated by the front wheels of vehicles crossing said contact strip in either direction, means for rendering either of said circuit closing means ineffective when the other thereof has first been actuated, and means for preventing a second actuation of either of said circuit closing means by the rear wheels of vehicles.

7. Means for recording the passage of traffic over a highway comprising a record strip, a plurality of markers associated with said strip, some of said markers being operable to impress one character of indicia upon said record and the other of said markers being operable to impress a different character of indicia upon said record strip, means for moving said record strip past said markers at a uniform speed, a contact strip extending across the roadway and engageable by a vehicle, operative connections between said contact strip and said markers, said connections being so arranged in the contact strip as to cause the selective operation of the markers according to the direction of movement on the highway of a vehicle engaging the contact strip, whereby the direction the vehicle is traveling on the highway is graphically indicated on said record strip.

8. Means for recording the passage of traffic over a roadway comprising a record strip, a plurality of electrically operated markers associated with said record strip, some of said markers being operable to impress one character of indicia on said record strip to graphically indicate on said record strip vehicles moving in one direction on the roadway and the other of said markers being operable to impress another character of indicia on said record strip to graphically indicate on said strip vehicles moving in the opposite direction on the roadway, means for moving said record strip past said markers at a uniform speed and means engageable by a vehicle for rendering said markers operative, said last mentioned means comprising a contact strip extending across the highway and engageable by a vehicle, operative connections between said contact strip and said markers, a pair of circuit closing means in said contact strip which are successively actuated by a vehicle crossing said contact strip in either direction, and means for rendering either one of said circuit closing means ineffective when the other has first been actuated.

ANTON DIEBOLD.